Patented Jan. 5, 1954

2,665,314

UNITED STATES PATENT OFFICE 2,665,314

SELECTIVE CHLORINATION OF 2,5-DICHLOROPHENAL TO 2,4,5-TRICHLOROPHENOL IN THE PRESENCE OF 2,4-DICHLOROPHENAL

Karl W. Krantz, Niskayuna, N. Y., assignor to E. I. du Pont de Nemours & Company, Wilmington, Del., a corporation of Delaware No Drawing. Application April 4, 1951,
Serial No. 219,307

3 Claims. (Cl. 260—623)

This invention relates to processes in which 2,5-dichlorophenol is selectively chlorinated to 2,4,5-trichlorophenol in the presence of 2,4-dichlorophenol to give mixtures of 2,4-dichlorophenol and 2,4,5-trichlorophenol. More particularly, it relates to processes in which 2,5-dichlorophenol is selectively chlorinated to 2,4,5-trichlorophenol by introducing chlorine into a liquid mixture of 2,4-dichlorophenol and 2,5-dichlorophenol at temperatures not above 60° C. and the introduction of chlorine is stopped before the total amount of chlorine reacted exceeds substantially one mol per mol of 2,5-dichlorophenol in said mixture of 2,4-dichlorophenol and 2,5-dichlorophenol.

Mixtures of 2,4-dichlorophenol and 2,5-dichlorophenol are readily obtained by several convenient routes as will be seen, but no practical way is known for separating such mixtures into their component dichlorophenols; and no worthwhile use has heretofore been found for such mixtures.

In contrast to the starting mixtures of 2,4- and 2,5-dichlorophenols, the 2,4-dichlorophenol-2,4,5-trichlorophenol mixtures obtained according to the processes of the present invention are easily separated into their component chlorinated phenols. Both the 2,4-dichlorophenol and 2,4,5-trichlorophenol obtained are valuable intermediates for the preparation of other compounds; for example, the 2,4,5-trichlorophenoxyacetic acid-type derivatives of 2,4,5-trichlorophenol are highly effective herbicidal agents just as are the 2,4-dichlorophenoxyacetic acid-type derivatives of 2,4-dichlorophenol. Thus, the 2,4-dichlorophenol - 2,4,5 - trichlorophenol mixtures can be suitably used, without separation of the component chlorinated phenols, in the preparation of highly effective phenoxyacetic acid-type herbicidal agents; or alternatively, the 2,4-dichlorophenol and 2,4,5-trichlorophenol can be separated and used separately in the preparation of their respective herbicidal derivatives, and for other purposes.

The processes of the present invention provide an excellent and commercially valuable outlet for the heretofore unwanted by-product alpha-benzene hexachloride obtained in the preparation of the important insecticidal agent gamma-benzene hexachloride. Gamma-benzene hexachloride is prepared by the chlorination of benzene by methods like or similar to those described in the Hardie patent, U. S. 2,218,148. In such chlorinations, the desired gamma-benzene hexachloride normally constitutes but a minor proportion of the chlorination product, the alpha isomer, alpha-benzene hexachloride, making up the major part of the product. Unfortunately, alpha-benzene hexachloride has little insecticidal value and therefore is usually either separated from the desired gamma isomer and discarded, or else used merely as a diluent for insecticidal compositions in which the gamma isomer is the essential active material; either way, the economic loss is considerable.

Now the present invention provides a valuable use for the by-product alpha-benzene hexachloride and other by-product benzene hexachloride isomers. The benzene hexachloride isomers are readily dehydrochlorinated to a mixture consisting predominately of 1,2,4-trichlorobenzene by treatment with bases in alcoholic solution. Such dehydrochlorination processes are described by van der Linden, Ber. der. Deut. Chem., vol. 45, pgs. 239–242 (1912). The trichlorobenzene is then hydrolyzed to dichlorophenols in accordance with conventional hydrolysis techniques; for example, trichlorobenzene is heated in alcoholic solution in an autoclave at a temperature of about 200° C. in the presence of about 2 mols of an alkali such as sodium hydroxide for each mol of trichlorobenzene.

The hydrolysis product is a mixture of dichlorophenols principally 2,5-dichlorophenol and 2,4-dichlorophenol with minor amounts of 3,4-dichlorophenol. The hydrolysis product ordinarily contains in the order of 70–75% 2,5-dichlorophenol by weight and 20–25%, 2,4-dichlorophenol by weight. The dichlorophenol mixture obtained from the hydrolysis reaction can then be used as the starting material for the processes of the present invention.

Alternatively, mixtures of 2,4- and 2,5-dichlorophenols for use in the processes of this invention are obtained by substitutively chlorinating benzene, monochlorobenzene, or dichlorobenzene by well known methods (e. g., see Britton, U. S. Patent 1,923,419) to trichlorobenzene, the latter consisting of the 1,2,4-trichloro isomer practically to the exclusion of other isomers. This trichlorobenzene is then hydrolyzed to a 2,4-dichlorophenol-2,5-dichlorophenol mixture as described above.

In the selective chlorination processes of this invention, chlorine is introduced into a liquid mixture of 2,4-dichlorophenol and 2,5-dichlorophenol. A liquid mixture is obtained by maintaining the temperature above the fusion point of the dichlorophenol mixture or the fusion point of the reacting mass. In other words, chlorine is introduced into a molten mix of 2,4-dichlorophenol and 2,5-dichlorophenol.

Alternatively, the liquid mixture of phenols employed in the chlorination processes of the invention is obtained by dissolving the phenols in a solvent relatively inert to chlorine. Illustrative of the solvents that can be used are carbon tetrachloride, ethylene dichloride, and trichlorobenzene. The use of a solvent makes possible a more fluid reacting mass and the use of lower temperatures, if desired.

The chlorine and the liquid mixture of dichlorophenols are brought together in any convenient manner. For example, gaseous chlorine is dispersed into a body of mixed molten 2,4- and 2,5-dichlorophenols or solutions of such mixtures in a relatively inert solvent in a batch type operation. Alternatively, the mixture of 2,4- and 2,5-dichlorophenols can be fed into a so-called pipe line reactor and chlorine injected at a plurality of points along the pipe line.

The selective chlorination processes of the invention can be carried out at temperatures up to and including, but not substantially in excess of 60° C. The selectivity of the 2,5-dichlorophenol chlorination falls off rapidly at temperatures above 60° C. For practical purposes, around 60° C. is a critical upper temperature limit for the processes. There is no corresponding critical minimum temperature in the same sense; thus, the selective chlorination can be carried out at temperatures of, say, 0° C. or lower, provided, of course, that a suitable solvent is employed for keeping the reacting system liquid. Actually, there is no significant advantage in operating at the lower temperatures. Therefore, for economic reasons, the practical minimum temperature is about 25° C., the reaction temperature that can be maintained without the use of expensive cooling means.

In carrying out the selective chlorination of a molten mix of 2,4-dichlorophenol and 2,5-dichlorophenol (i. e. in the absence of a solvent), the temperature of the reacting system is maintained in the range of 40° C. to 60° C. substantially thruout the cycle. If a solvent is used, lower temperatures can be employed.

Chlorine reacts readily with 2,5-dichlorophenol to form 2,4,5-trichlorophenol under the aforementioned conditions. No catalyst is needed. The chlorination proceeds in the dark as well as in the presence of light.

Preferably, the rate at which chlorine is introduced into the liquid mixture is controlled so that substantially all of the chlorine introduced reacts. In other words, the rate of chlorine addition is controlled so that it is not substantially in excess of that at which the chlorine is consumed in the chlorination reaction: chlorine is not used in such excess that substantial quantities pass thru the liquid reacting system unchanged.

The introduction of chlorine can be terminated and the chlorinating step stopped at any point up to that at which the total amount of chlorine introduced corresponds to approximately one mol per mol of 2,5-dichlorophenol in the initial mixture of 2,4-dichlorophenol and 2,5-dichlorophenol. It is undesirable to introduce chlorine in substantial excess above about one mol per mol of 2,5-dichlorophenol. Preferably, in order to obtain maximum yields, the introduction of chlorine is continued until the total amount of chlorine introduced corresponds to approximately one mol per mol of 2,5-dichlorophenol, and then the introduction of chlorine is terminated.

The mixtures of 2,4-dichlorophenol and 2,4,5-trichlorophenol obtained by the processes of this invention can be used, with or without further refining, for reaction, for example, with monochloroacetic acid and similar halogenated carboxylic acids in the presence of an alkali such as sodium hydroxide to produce mixed 2,4-dichloro and 2,4,5-trichlorophenoxyacetates and similar herbicidal agents of the 2,4-D type. If desired, the 2,4-dichlorophenol and 2,4,5-trichlorophenol mixtures obtained according to this invention can be further processed to separate and recover the component chlorophenols. For example, the mixtures can be separated by fractional distillation at atmospheric pressure or under reduced pressure.

The invention is illustrated by the following specific example.

A mixture consisting of 25% by weight of 2,4-dichlorophenol and 75% by weight 2,5-dichlorophenol (set point of mixture was 42.4° C.) was heated to about 45° C. to give a melt. Gaseous chlorine was then gradually introduced into the molten mass while maintaining the temperature of the mass in the range of 42° C. to 51° C. The chlorine feed rate was maintained substantially uniform for 1.5 hours and all the chlorine introduced was consumed in the reaction. At the end of the 1.5 hour period, a total of one mol of chlorine had been introduced for each mol of 2,5-dichlorophenol in the original dichlorophenol mixture, and the chlorine feed was stopped.

The chlorinate was fractionated. A fraction amounting to 24.5% by weight of the chlorinate and having a boiling range of 214–217° C. at atmospheric pressure was separated. This material consisted of dichlorophenols and fractions taken within the boiling range were found to have set points of 25.4° C., 25.9° C., and 27.4° C. The remainder of the chlorinate consisted essentially of trichlorophenols.

Addition of a quantity of pure 2,5-dichlorophenol to the aforementioned dichlorophenol fractions depressed the set points establishing thereby that the dichlorophenol fraction was on the 2,4-dichlorophenol-rich leg of the eutectic curve for 2,4-dichlorophenol-2,5-dichlorophenol mixtures. Therefore, by comparison with the eutectic curve for 2,4- 2,5-dichlorophenol mixtures of known compositions, the dichlorophenol fraction of this example was found to contain approximately 75% 2,4-dichlorophenol and the remainder unchlorinated 2,5-dichlorophenol.

The trichlorophenol fraction obtained in this example contained principally 2,4,5-trichlorophenol. Approximately 90% of the 2,5-dichlorophenol present in the initial 2,4- 2,5-dichlorophenol mixture had been chlorinated in the process and only a minor amount of the 2,4-dichlorophenol had reacted.

The lack of selective chlorination of 2,5-dichlorophenol at temperatures substantially in excess of 60° C. is illustrated by the following experiment:

53.5 parts by weight of chlorine was added gradually over a 40-minute period to 288.5 parts by weight of a mixture containing 78% by weight 2,5-dichlorophenol and 22% by weight 2,4-dichlorophenol while maintaining the temperature at 75–94° C. The starting dichlorophenol mixture was obtained by the hydrolysis of 1,2,4-trichlorobenzene and the composition of the mixture was determined from its set point in comparison with the set point of known mixtures of 2,4- and 2,5-dichlorophenols.

The chlorinate was fractionated. The first two fractions were mixtures of dichlorophenols. The third fraction contained both di- and trichlorophenols and the fourth fraction was trichlorophenols. Data are given in the following table.

Table I

| Fraction | Percent by weight of charge | B. P., °C. at 26 mm. Hg | Set Point | Composition of Fraction |
| --- | --- | --- | --- | --- |
| 1 | 11.6 | 106-8 | 42.1 | 76% 2,5-dichlorophenol, balance 2,4-dichlorophenol. |
| 2 | 33.9 | 108-9 | 36.7 | 71% 2,5-dichlorophenol, balance 2,4-dichlorophenol. |
| 3 | 12.7 | 109-39 | | mixed di and trichlorophenols. |
| 4 | 37.0 | 139-40 | | mixed trichlorophenols. |

When fractions 1 and 2 were individually mixed with pure 2,4-dichlorophenol, a depression of the set point resulted, showing that fractions 1 and 2 were on the 2,5-dichlorophenol-rich leg of the eutectic mixture.

The data in Table I show that the unchlorinated materials (fractions 1 and 2) were not substantially different in composition from the starting dichlorophenol mixture. Therefore, there was no appreciable selective chlorination of the 2,5-dichlorophenol at the temperature employed in this example.

I claim:

1. In a process for selectively chlorinating 2,5-dichlorophenol to 2,4,5-trichlorophenol in the presence of 2,4-dichlorophenol to obtain a mixture of 2,4-dichlorophenol and 2,4,5-trichlorophenol, the steps comprising effecting chlorination by introducing chlorine into a mixture consisting essentially of molten 2,4-dichlorophenol and molten 2,5-dichlorophenol at a temperature of 40° C. to 60° C., and stopping the introduction of chlorine into the mixture before the total amount of chlorine reacted in said chlorination substantially exceeds one mol per mol of 2,5-dichlorophenol in said mixture of 2,4-dichlorophenol and 2,5-dichlorophenol.

2. In a process for selectively chlorinating 2,5-dichlorophenol to 2,4,5-trichlorophenol in the presence of 2,4-dichlorophenol to obtain a mixture of 2,4-dichlorophenol and 2,4,5-trichlorophenol, the steps comprising effecting chlorination by introducing chlorine into a mixture consisting essentially of molten 2,4-dichlorophenol and molten 2,5-dichlorophenol at a temperature of 40° C. to 60° C., and at a rate not substantially in excess of the rate at which the chlorine is consumed in the chlorination reaction, and stopping the introduction of chlorine into the mixture before the total amount of chlorine introduced substantially exceeds one mole per mol of 2,5-dichlorophenol in said mixture of 2,4-dichlorophenol and 2,5-dichlorophenol.

3. In a process for selectively chlorinating 2,5-dichlorophenol to 2,4,5-trichlorophenol in the presence of 2,4-dichlorophenol to obtain a mixture of 2,4-dichlorophenol and 2,4,5-trichlorophenol, the steps comprising effecting chlorination by introducing chlorine into a molten mixture containing 20-25% 2,4-dichlorophenol by weight and 70-75% 2,5-dichlorophenol by weight at a temperature of 40° C. to 60° C., and at a rate not substantially in excess of that at which the chlorine is consumed in the chlorination reaction, and stopping the introduction of chlorine into the mixture when the total amount of chlorine introduced corresponds to approximately one mol per mol of 2,5-dichlorophenol in said mixture of 2,4-dichlorophenol and 2,5-dichlorophenol.

KARL W. KRANTZ.

References Cited in the file of this patent

UNITED STATES PATENTS

| Number | Name | Date |
| --- | --- | --- |
| 2,010,841 | Bender | Aug. 13, 1935 |
| 2,440,602 | Foster et al. | Apr. 27, 1948 |

OTHER REFERENCES

Lucas, Organic Chemistry, pages 358-359, (1935). American Book Co., New York.